United States Patent
Hickman et al.

(10) Patent No.: US 7,966,878 B2
(45) Date of Patent: Jun. 28, 2011

(54) METHOD FOR MEASURING LIQUID CRYOGEN LEVEL USING A LEVEL PROBE

(75) Inventors: Kevin Jonathan Hickman, Witney (GB); Anthony John Salloway, Northampton (GB)

(73) Assignee: Siemens Plc, Frimley, Camberley, Surrey (GB)

( * ) Notice: Subject to any disclaimer, the term of this patent is extended or adjusted under 35 U.S.C. 154(b) by 545 days.

(21) Appl. No.: 11/628,722

(22) PCT Filed: Jun. 16, 2005

(86) PCT No.: PCT/EP2005/006487
§ 371 (c)(1),
(2), (4) Date: Sep. 17, 2007

(87) PCT Pub. No.: WO2005/124294
PCT Pub. Date: Dec. 29, 2005

(65) Prior Publication Data
US 2008/0156091 A1 Jul. 3, 2008

(30) Foreign Application Priority Data

Jun. 21, 2004 (GB) .................................. 0413837.6
Dec. 23, 2004 (GB) .................................. 0428174.7

(51) Int. Cl.
*G01F 23/00* (2006.01)
(52) U.S. Cl. ............................................... 73/295
(58) Field of Classification Search ............. 73/304 R, 73/295
See application file for complete search history.

(56) References Cited

U.S. PATENT DOCUMENTS

| 3,496,773 A | | 2/1970 | Cornish | |
| 3,943,767 A | * | 3/1976 | Efferson | 73/295 |
| 4,118,984 A | * | 10/1978 | Kuraoka et al. | 73/295 |

FOREIGN PATENT DOCUMENTS

| GB | 1135485 A | 12/1968 |
| GB | 2 401 688 A | 11/2004 |
| JP | 8-35875 | 2/1996 |
| WO | WO 97/08518 | 3/1997 |

OTHER PUBLICATIONS

German Office Action dated Apr. 2, 2008 including English translation (six (6) pages).
International Search Report dated Sep. 26, 2005 and PCT/ISA/237 (Written Opinion of the International Searching Authority) (Thirteen (13) pages).
Great Britain Search Report dated Apr. 27, 2005 (Two (2) pages).

* cited by examiner

*Primary Examiner* — Hezron Williams
*Assistant Examiner* — Nathaniel Kolb
(74) *Attorney, Agent, or Firm* — Crowell & Moring LLP

(57) ABSTRACT

A method of measuring a level of liquid cryogen, comprising the steps of immersing a liquid cryogen level probe in a liquid cryogen; applying a propagation current to the heater (26) to induce quench in at least an adjacent part of the superconductive material (22); removing the propagation current from the heater; applying a measurement current to the superconductive material; and measuring (30) a voltage across the superconductive material thereby to determine the level of the liquid cryogen. In articular, the method comprises the steps of monitoring (40) the voltage across the superconductive material while the propagation current is being applied; and ceasing application of the propagation current in response to the detection of a voltage across the superconductive material which exceeds a certain threshold level.

8 Claims, 3 Drawing Sheets

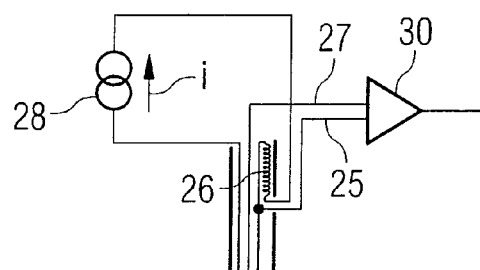
FIG 2
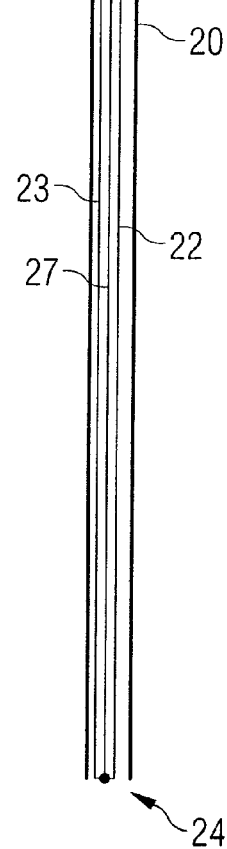
PriorArt
FIG 3

METHOD FOR MEASURING LIQUID CRYOGEN LEVEL USING A LEVEL PROBE

The present invention relates to a level probe useful for measuring the level of a liquid cryogen. In particular, it relates to a level probe comprising a length of superconducting material, and an improved method of its use.

In particular, the present invention relates to the control of a heater for propagating a normal resistive front along the superconducting material of a cryogen level probe, enabling a measurement of liquid cryogen level to be made.

FIG. 1 shows a cryostat such as may be employed for holding magnet coils for an MRI (magnetic resonance imaging) system. A cryogenic vessel 1 holds a liquid cryogen 2. The space 3 in the cryogenic vessel above the level of the liquid cryogen may be filled with evaporated cryogen. The cryogenic vessel is contained in a vacuum jacket 4 which serves to reduce the amount of heat flowing to the cryogen 2 from ambient temperature, by reducing the possibility of conduction or convection heating of the cryogen vessel 1. One or more heat shields 5 may be provided in the vacuum space between the cryogenic vessel 1 and the vacuum jacket 4. These shields serve to reduce the amount of radiated heat reaching the cryogenic vessel 1 from the exterior. An access neck 6 is provided, allowing access to the cryogenic vessel from the exterior. This is used to fill the cryogenic vessel, to provide access for current leads and other connections to superconductive coils housed within the cryogenic vessel, and to allow an escape path for boiled-off gaseous cryogen.

In such systems, it is necessary to regularly monitor the level of the liquid cryogen, while the system is still in an operational state. This is necessary to detect leaks, indicated by an unusually high consumption of cryogen, and to ensure that the liquid cryogen is topped up at appropriate intervals. This is necessary to ensure that the magnet coils or other articles are cooled by the liquid cryogen. At low cryogen levels, parts of the magnet will be at a higher temperature than when the cryogen level is high.

In the case of a superconducting magnet, this could lead to a magnet quench, which may be dangerous and damaging to the system. The magnetic field would also collapse as a result of the current in the coils reducing, due to energy loss, caused by the higher resistance of the coils in their normal state. However, the measurement process should not represent an undue heat input to the system. It is generally regarded as sufficient to measure the level of liquid cryogen once per day.

A guide tube 10 is provided inside the cryogenic chamber for housing a cryogen level probe. The guide tube 10 runs from the access neck 6 to approximately the lower extremity of the cryogenic vessel. The guide tube is not sealed at its end, but fills with liquid cryogen to the level of the liquid cryogen in the cryogenic chamber. The guide tube 10 may house a cryogen level probe for measuring the depth of the liquid cryogen 2 in the cryogenic vessel 1.

FIG. 2 shows a cryogen level probe according to the prior art. A protective flexible carrier 20, for example a sleeve or an open-ended, perforated or porous tube of stainless steel, nylon, glass fibre composite, polytetrafluoroethylene or other appropriate material, carries a strip or wire of superconducting material 22. The superconductive strip or wire 22 runs in one direction only down the length of the probe. In such embodiments, a return current path conductor 23 is connected to the distal end 24 of the strip or wire of superconducting material 22. This is a normal, resistive material such as copper. Other probe variants include cryogen level probes that have a strip or wire of superconducting material 22 which is bent back on itself, in a U-shape. In such embodiments, no further connections need be made at the distal end 24 of the probe. A small resistance heater 26 is connected to one end of the superconductive strip or wire 22, in close thermal contact with it. The heater may have a resistance of the order of 4Ω, and must be made of a material which is resistive at the temperatures of interest. For example, Ni-chrome or Constantan wire maintains a high electrical resistance, even at temperatures of about 4K.

A current source 28 is provided, and in use supplies a current i through the series combination of the heater 26, superconductive strip or wire 22 and the return current path conductor 23. A differential amplifier 30 or other appropriate detector is connected by voltage sensing leads 25, 27, respectively to the superconductive strip or wire 22 just below the heater 26, and to the distal end of the superconductive strip or wire 22. The differential amplifier 30 or other appropriate detector detects the presence of any voltage across the part of the superconductive strip or wire 22 which lies between the respective connection points of the voltage sensing leads. In some probes the voltage detector is connected to different points on the strip or wire of superconducting material 22. In the illustrated type of embodiment, where the strip or wire of superconducting material 22 runs in one direction only, from the top to the bottom of the probe, the voltage sensing leads can be connected to the ends of the strip or wire of superconducting material 22. Alternatively, the upper voltage sensing lead 25 may be connected some distance below the heater, to provide a cryogen level probe which will give a full level (100%) when the cryostat is filled with less helium.

In use, the cryogen level probe is dipped into the liquid cryogen to be measured, for example by sliding it into the guide tube 10 illustrated in FIG. 1. As current i flows, the heater 26 heats adjacent part(s) of the superconductive strip or wire 22 above the critical temperature, and such part(s) become(s) resistive. In embodiments where the strip or wire of superconducting material 22 is bent into a U-shape, both ends of the strip or wire of superconducting material 22 may be heated, and become resistive. The heater and any further heat supplied by the resistive part(s) of the superconductive strip or wire 22 causes a normal resistive front to propagate down the superconductive strip or wire 22 until the front reaches the level of the cryogen. Below this point, the cryogen maintains the superconductive strip or wire 22 below its critical temperature.

Since the superconductive strip or wire 22 in superconductive state has no resistance, while the resistive part of the superconductive strip or wire has a resistance proportional to its length, then the length of the resistive part and hence the level of the cryogen, may be determined by supplying a current i through the strip or wire of superconducting material 22 and measuring the resultant voltage across it. This voltage, indicated by the output of the differential amplifier 30 or another suitable sensor, will be proportional to the (total) length of the resistive part(s) of the superconductive strip or wire 22, so indicating the amount of superconductive strip or wire 22 which is above the level of the liquid cryogen and so indicating the level of the liquid cryogen. Such apparatus is described, for example, in U.S. Pat. Nos. 3,496,773 and 3,943,767.

In the prior art, a small read current, generally a constant current, is applied to the heater and the superconductive strip or wire 22. The heater may or may not heat sufficiently to quench the adjacent part of the superconductive strip or wire 22, depending on its temperature at the start of the measurement process. If the read current is too low, the quench process will not begin, and no normal resistive (quench) front will propagate. If the read current is too high, the heat generated by the superconductive strip or wire 22 may form a gas blanket around the superconductive strip or wire 22 under the surface of the liquid cryogen, and a lower-than-actual level of liquid cryogen will be indicated. In an extreme case, an empty level may be indicated if the read current is sufficient to generate a gas blanket around the superconductive strip or wire 22 right to its lower extremity.

Another known method of operating the liquid cryogen level probe of FIG. 2 will now be discussed with reference to FIG. 3. FIG. 3 shows a current pulse applied by current source 28 to the series combination of the heater 26 and the superconductive strip or wire 22. The current i rises sharply to a brief peak value before dropping to a steady value for a relatively long period of time. The relatively lengthy steady phase may represent a current of 250 mA for a time period of about 10 seconds, while the brief peak may represent a current of 400 mA which lasts for about 20 ms. The intended operation of the level probe is as follows. The brief peak of high value current was intended to heat an adjacent part of the superconductive strip or wire 22 above its critical temperature. This part then becomes resistive. The heat produced by resistor 26 and the additional heat produced by the measurement current flowing through the resistive part of the superconductive strip or wire 22 will propagate the normal resistive (quench) front to the surface of the liquid cryogen, where propagation will stop, since the remainder of the superconductive strip or wire 22 is held below its critical temperature by the liquid cryogen. After a suitable length of time, but during the steady phase, the voltage across the superconductive strip or wire 22, as detected by differential amplifier 30 or another suitable detector is recorded. The depth of cryogen in the cryogen vessel is calculated from this detected voltage.

U.S. Pat. No. 3,943,767 describes a method of operation of a liquid cryogen level sensor such as that shown in FIG. 2. According to that document, a constant read current is applied to the superconductive strip or wire 22, and the rate of increase of the detected voltage is monitored. When the rate of increase of the voltage falls to near zero, it is assumed that the normal resistive (quench) front has reached the upper surface of the liquid cryogen, the voltage is used to determine the level of the liquid, and the read current is stopped.

U.S. Pat. Nos. 4,118,984 and 3,496,773 describe somewhat similar arrangements, as does European patent application EP 0 076 120.

The cryogen level indicating method and apparatus described above is conventional. In this conventional apparatus and method, the following problems are encountered.

This method of operation illustrated in FIG. 3 is not very reliable. The short initial peak may not be sufficient to reliably induce quench in the superconductive strip or wire 22. If the magnitude or duration of the short initial peak were increased, then there is a risk of over heating the superconductive wire, so that the normal (quench) front propagates below the surface of the liquid cryogen, giving a falsely low reading of cryogen depth.

In the presence of boiled-off cryogen in the space 3, the cryogen level probe is cooled by the boiled off cryogen, meaning that it is difficult to propagate a resistive quench front all the way to the surface of the liquid cryogen. This difficulty has been overcome in the past by increasing the current i supplied to the heater, to increase the heat supplied to the superconductive strip or wire 22, and improve the resistive quench propagation. This in turn raises further problems. Particularly, but not exclusively, when the cryogen vessel is relatively empty, the heat provided by the heater 26 and the resistive parts of the superconductive strip or wire 22 may heat the superconductive strip or wire 22 to such an extent that the quench front is propagated below the surface of the liquid cryogen.

The present invention provides an improved method for operating a liquid cryogen level probe such as that illustrated in FIG. 2, in a manner so as to address at least some of the problems of the known methods of operation.

The present invention accordingly provides methods as defined in the appended claims.

The above, and further, objects, characteristics and advantages of the present invention will become more apparent from a consideration of certain embodiments thereof, given by way of examples only, in conjunction with the accompanying drawings, wherein:

FIG. 2 shows a liquid cryogen level probe which may be operated according to the present invention;

FIG. 3 shows a current pulse which rises sharply to a brief peak before dipping to a steady value for a relatively long period;

Figure 4:
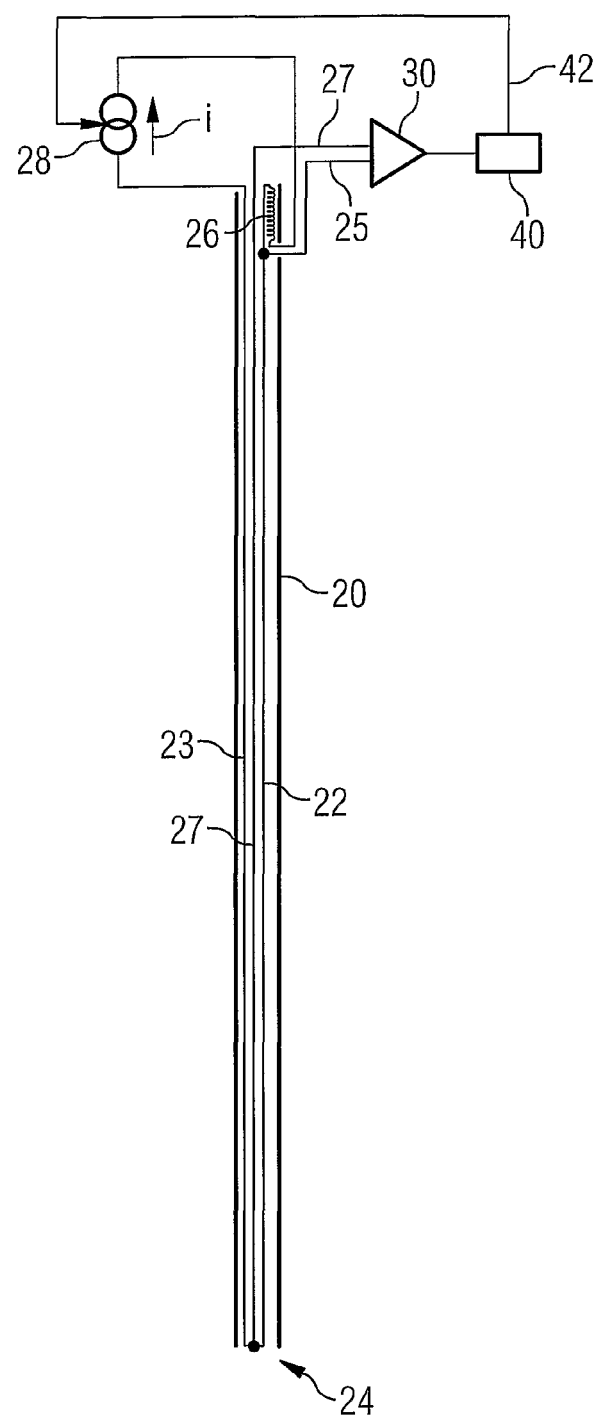
FIG. 4 illustrates an arrangement according to an embodiment of the present invention.

As illustrated in FIG. 4, according to an aspect of the present invention, a control circuit 40 is provided, receiving the output of the differential amplifier 30 or other voltage sensor. According to the received output from the differential amplifier 30 or other voltage sensor, the control circuit produces a control signal over feedback path 42 to the current source 28.

According to the present invention, the cryogen level probe is operated as follows. A propagation current of relatively high value is first applied through the heater 26, superconductive strip or wire 22 and current return path 23, as instructed by the control circuit 40 to the current source 28. Since the superconductive strip or wire 22 will at least initially be in a superconducting state, no voltage will be detected by detector 30. Control circuit 40 will maintain the current i at its relatively high propagation level. With the current i at such a high value, the adjacent part of the superconductive strip or wire 22 will be quenched, and enter a resistive state. A corresponding voltage will be developed across the corresponding part of the superconductive strip or wire 22, and this voltage will be detected by the detector 30. The detection of this voltage is provided to the control circuit 40. The detection of this voltage indicates that part of the superconductive strip or wire 22 has been quenched, and is in a normal, resistive, mode of conduction.

The control circuit 40 is arranged to halt the propagation current being supplied by current source 28 once a certain voltage level has been detected by detector 30. In an example, if the maximum voltage to be detected by the detector 30 is about 27V, which would be the result if an empty cryogen vessel were measured and the whole of superconductive strip or wire 22 were in normal mode, then the control circuit 40 may be arranged to halt the propagation pulse once a voltage of 0.5V is measured. In another embodiment, the threshold voltage for propagation current turn-off may be set to the voltage corresponding to a "full" level of liquid cryogen. Of course, other values and proportions may be chosen, and may be determined to provide optimum performance based on routine trial and error. Once the propagation current is halted, the current source 28 provides a measurement current enabling propagation of the normal resistive (quench) front to the liquid cryogen surface and measurement of the liquid cryogen level. The magnitudes of the propagation and measurement currents may be, for example, 400 mA and 250 mA respectively.

By ceasing the propagation current only once a predetermined voltage is detected across the superconductive strip or wire 22, the propagation current is only halted once quench is definitely started, avoiding the possibility that the superconductive strip or wire 22 is not in fact quenched. Equally, the propagation current is halted as soon as possible, reducing the possibility of over heating the superconductive strip or wire 22.

The duration of the propagation current will depend on the initial temperature of the superconductive strip or wire 22, and so will adapt to the initial temperature of the probe at each measurement. Furthermore, the method of the present invention is reactive to variations in the characteristics of the probe. For example, different probes may need different levels of heating to initiate a quench, and different heaters may provide different heat output for a same applied current.

One typical variation between nominally identical probes is that introduced by soldered joints commonly used to provide electrical interconnection between the superconductive strip or wire 22 and the heater 26, or between voltage sense leads 25, 27 and the superconductive strip or wire 22. No two soldered joints will be identical, and different heat levels will be required to overcome the thermal impedance of each soldered joint.

The voltage sense leads 25, 27 connecting the detector 30 to the superconductive strip or wire 22 also provide a thermal drain on the heater.

Figure 1:
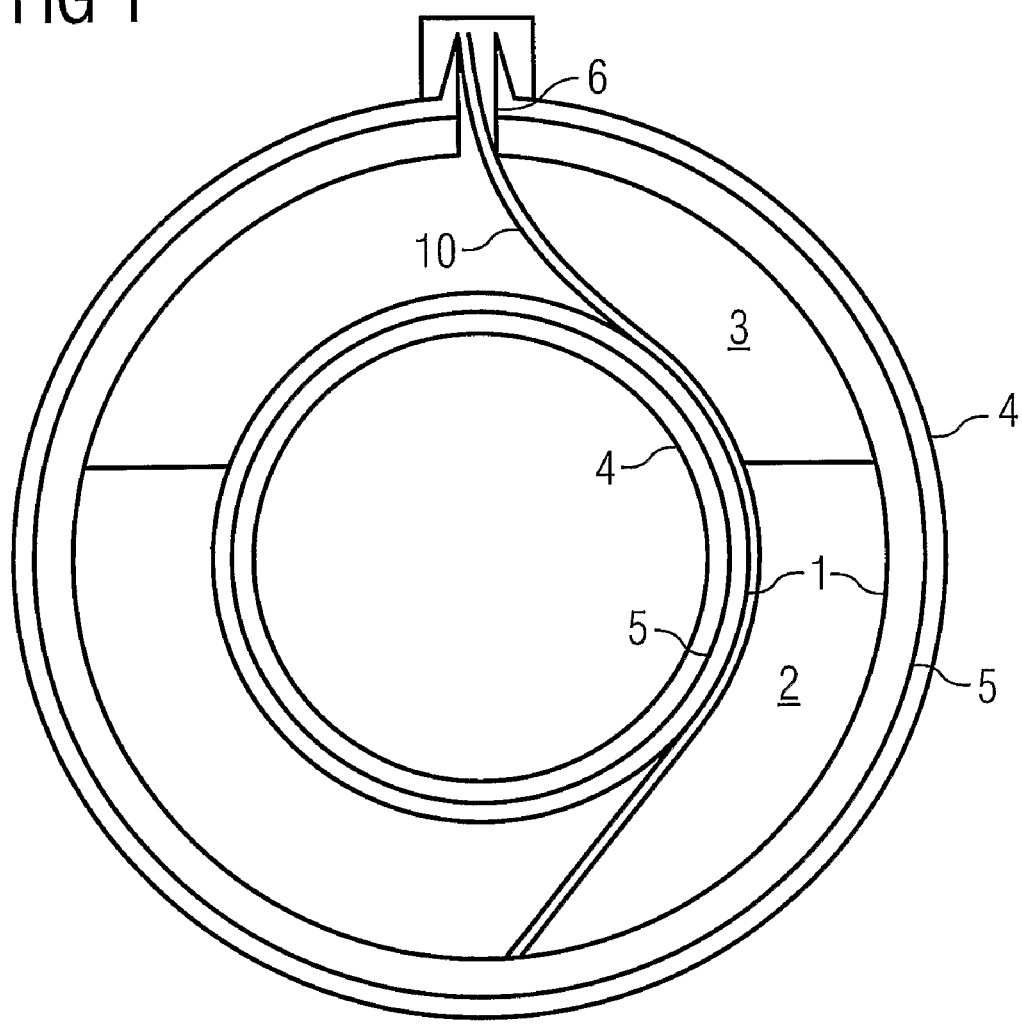
FIG. 1 shows a cryostat which may benefit from application of the present invention.

The guide tube 10 shown in FIG. 1 will have a certain thermal conductivity, and will be in contact with the level probe at certain points. This will accordingly present an unpredictable thermal load, and may prevent quench initiation in known arrangements.

The gaseous cryogen within the cryogen vessel 1 may be stratified, meaning that the ambient temperature experienced by the heater is higher than the boiling point of the cryogen. In this case, the amount of heat required to begin a quench will be reduced compared to the amount of heat required to commence a quench from the lower boiling point temperature which may be expected.

In known systems, a propagation current and duration would need to be defined which would give a reasonably reliable quench initiation across these variations. This would have the disadvantage of producing over propagation of the normal resistive front in some probes, while potentially failing to initiate a quench in some other probes. The present invention, by using feedback of measured voltage across the superconductive strip or wire 22, ensures that quench propagation begins, but heating stops as soon as possible, to avoid measurement errors introduced by over-heating of the superconductive strip or wire 22, and reduces to a minimum the level of cryogen boil-off caused by the measurement process.

In an example embodiment, the superconducting material is provided with a cupro-nickel cladding. This provides the wire with a known resistance per unit length when the superconductor element is in the normal state and gives the wire a low temperature coefficient of resistance. The superconducting material itself may be any superconducting material having a transition temperature above the boiling point of the liquid cryogen. A Niobium-Titanium (Nb—Ti) superconducting alloy having a critical temperature of 9K may be suitable for systems using liquid helium as the cryogen.

In an improvement to the method of the present invention, fluctuations may be introduced into the measurement current, for example a ±10% variation. If the measured voltage indicated by detector 30 also fluctuates by a corresponding ±10%, one may be sure that the resistive quench front has propagated to the surface of the liquid cryogen. If the normal (quench) front has not propagated to the surface of the liquid cryogen, the measurement current would still likely be aiding propagation of the front. In this case, the ±10% variation in the measurement current would not produce a corresponding variation in the voltage detected by detector 30. In response to the absence of detection of corresponding fluctuations, the measurement current may be continued to be applied until such corresponding fluctuations are detected.

Another improvement to the method of the current invention is to detect changes in the voltage detected when the superconducting wire or strip of the probe has a normal front which has propagated to the level of the cryogen and the measurement current is being used to determine the liquid cryogen level. The voltage oscillates due to the liquid level changing as a result of the localised gas movement and hence effective liquid level change. If the superconducting wire or strip of the probe has a normal front which has propagated so the normal resistive front moves down the superconductive strip or wire 22, the voltage detector (30) may give a constant voltage reading indicating a particular cryogen liquid level. If the superconductive strip or wire 22 happens to be in relatively good thermal contact with other materials such as a guide tube or helium probe housing, the level indicated by the constant voltage output of the probe may be spurious and not representative of the liquid cryogen level, but may rather indicate the location of a thermal load on the probe. To determine if the liquid cryogen level has been reached, the voltage from the detector (30) needs to be examined. As the measurement current flows through the resistive (quenched) part of the superconductive strip or wire 22, heat is generated. This heat will cause boiling of the surface of the liquid cryogen, at least in the vicinity of the superconductive strip or wire 22 where it meets the surface of the liquid cryogen. The boiling effect will cause small variations in the level of the liquid cryogen, and so small variations in the measured voltage. If voltage oscillations caused by the boiling surface can be detected, the voltage level can be used to give the correct liquid cryogen fill level. If voltage oscillations cannot be detected, the normal propagation front on the superconductive strip or wire 22 may have "stuck". This will occur if the heat causing the normal front to propagate down the superconductive strip or wire 22 is conducted away from the superconductive strip or wire 22 due to its contact with other materials. In this case, additional heat needs to be generated in the superconductive strip or wire 22 so that the resistive front can propagate further. Under these conditions, the current from the constant current source would be increased to allow the level to be detected which would be verified by the detection of the voltage oscillations at another detected voltage level.

Figure 5:
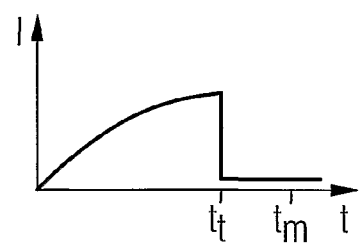
FIG. 5 shows a current pulse according to an aspect of an embodiment of the present invention.

In another improvement to the present invention, the propagation current applied to the heater may not be a constant current, but may be ramped. For example, the propagation current i applied to the heater 26 and the superconductive strip or wire 22 may have the time profile as shown in FIG. 5. The applied propagation current i initially rises very sharply, with the rate of increase gradually slowing as the magnitude of propagation current i increases. The current increases rapidly to values which may be expected to cause the heater to cause propagation of the normal front. The rate of change of the current is reduced at this point to allow the propagation heater current to be turned off as soon as normal resistive wire is detected.

Once a part of the superconductive strip or wire 22 has been quenched, and entered its normal resistive state, the voltage detector 30 will detect a corresponding voltage, being a product of the resistance of the quenched part of the superconductive strip or wire 22 and the magnitude of the current i. The magnitude of this voltage will increase with the increasing magnitude of current i and also with the increasing resistance of the superconductive strip or wire 22 as the normal (quench) front propagates towards the surface of the liquid cryogen. When the detected voltage meets the threshold value as determined by control circuit 40, at time $t_t$ in FIG. 5, a signal is sent along the feedback path 42 to control the current source 28 so as to reduce current i to its measurement value. A certain delay period is allowed to ensure that the normal resistive (quench) front has propagated to the surface of the liquid cryogen, and the voltage detected by the detector 30 at time $t_m$ is recorded, for example by the control circuit 40, and used to determine the level of the liquid cryogen.

The method of the present invention may be applied to probes such as those illustrated in FIGS. 2 and 4, in which the superconductive strip or wire 22 runs in one direction only along the length of the probe. The present invention may also be applied to probes which have a superconductive strip or wire bet into a U-shape.

In alternative embodiments of the present invention, the voltage sense lead 25 at the heater end of the superconductive strip or wire 22 may be in different positions. This connection may be as shown in FIG. 4, at the top of the superconductive strip or wire 22 between the superconductive strip or wire 22 and the heater or on the other side of the heater. The threshold voltage to turn off the propagation current to the heater would be different. This voltage would be set so that the superconductive strip or wire 22 under the heater changed into the normal state. Both positions can be used with different threshold voltages to achieve the same improvement in the quench initiation before the read current is enabled. The 100% fill level and scaling can then be changed for any probe configuration.

The present invention has been described with particular reference to embodiments in which the heater and the superconducting wire or strip are placed in series, with a single current source providing a current i through the series arrangement. In alternative embodiments, currents may be separately applied to the heater and to the superconducting wire or strip, such that the propagating current is applied only to the heater and the measurement current is applied only to the superconducting wire or strip.

The invention claimed is:

1. A method of measuring a level of liquid cryogen, comprising:
   providing a cryogen level probe comprising a length of superconductive material, means for applying a current to the superconductive material, a heater for heating the superconductive material and means for measuring the voltage across the superconductive material;
   dipping the liquid cryogen level probe in a liquid cryogen;
   applying a propagation current to the heater to heat a part of the superconductive material above the critical temperature, thereby causing a normal resistive front to propagate along the superconductive material;
   removing the propagation current from the heater;
   applying a measurement current to the superconductive material; and
   measuring a voltage across the superconductive material thereby to determine the level of the liquid cryogen; wherein
   the magnitude of voltage across the superconductive material is monitored while the propagation current is being applied; and
   the propagation current is removed from the heater in response to detection of a voltage across the superconductive material which exceeds a certain threshold level.

2. A method according to claim 1 wherein the heater and the superconducting material are electrically connected in series, the propagation current and the measurement current representing different magnitudes of a current applied through the series connected heater and superconducting material.

3. The method according to claim 1, further comprising:
   introducing fluctuations into the measurement current;
   detecting corresponding fluctuations in the magnitude of the voltage across the superconductive material while the measurement current is being applied; and
   in response to the detection of corresponding fluctuations, accepting the magnitude of the voltage across the superconductive material while the measurement current is being applied as an indication of the level of the liquid cryogen.

4. The method according to claim 3, wherein, in the absence of detection of corresponding fluctuations, application of the measurement current is continued until such corresponding fluctuations are detected.

5. The method according to claim 1, further comprising the steps of:
   detecting voltage fluctuations in the measured voltage;
   in response to fluctuations being detected, accepting the measured voltage for determining the level of liquid cryogen; and in response to no fluctuations being detected, increasing the measurement current and repeating the step of detecting voltage fluctuations in the measured voltage.

6. The method according to claim 1, wherein the propagation current applied to the heater is ramped, increasing in magnitude while it is applied.

7. The method according to claim 6 wherein the magnitude of the propagation current initially rises very sharply, with the rate of increase gradually slowing as the magnitude of the propagation current increases.

8. The method according to claim 1, wherein the threshold level corresponds to a voltage indicating a maximum expected level of liquid cryogen.

* * * * *